(12) United States Patent
Maguire et al.

(10) Patent No.: US 8,394,525 B2
(45) Date of Patent: Mar. 12, 2013

(54) SUPPORT ASSEMBLY FOR AN ARRAY OF BATTERY CELLS

(75) Inventors: Patrick Daniel Maguire, Ann Arbor, MI (US); Sarav Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 12/820,517

(22) Filed: Jun. 22, 2010

(65) Prior Publication Data

US 2011/0177372 A1    Jul. 21, 2011

(51) Int. Cl.
*H01M 10/02* (2006.01)
*H01M 2/10* (2006.01)

(52) U.S. Cl. .......... 429/157; 429/158; 429/99; 29/623.1

(58) Field of Classification Search .......... 429/148–153, 429/156–159; 29/623.1
See application file for complete search history.

(56) References Cited

U.S. PATENT DOCUMENTS

| | | | |
|---|---|---|---|
| 4,522,898 A | 6/1985 | Esrom | |
| 5,578,392 A | 11/1996 | Kawamura | |
| 6,174,618 B1 | 1/2001 | Nishiyama et al. | |
| 6,340,877 B1 | 1/2002 | Mita et al. | |
| 6,379,837 B1 * | 4/2002 | Takahashi et al. | 429/151 |
| 6,410,184 B1 * | 6/2002 | Horiuchi et al. | 429/156 |
| 6,410,185 B1 | 6/2002 | Takahashi et al. | |
| 6,558,835 B1 | 5/2003 | Kurisu et al. | |
| 6,705,418 B2 | 3/2004 | Wessman | |
| 7,399,551 B2 | 7/2008 | Yagi et al. | |
| 2002/0187390 A1 | 12/2002 | Kimoto et al. | |
| 2003/0017383 A1 | 1/2003 | Ura et al. | |
| 2003/0134189 A1 | 7/2003 | Kanai et al. | |
| 2003/0143459 A1 * | 7/2003 | Kunimoto et al. | 429/158 |
| 2004/0043287 A1 * | 3/2004 | Bando et al. | 429/156 |
| 2004/0137313 A1 | 7/2004 | Jaura et al. | |
| 2006/0028170 A1 * | 2/2006 | Izawa | 320/107 |
| 2007/0148536 A1 | 6/2007 | Kang et al. | |

(Continued)

FOREIGN PATENT DOCUMENTS

| | | |
|---|---|---|
| WO | WO 2006099602 A2 * | 9/2006 |
| WO | 2007081759 A1 | 7/2007 |
| WO | 2007112116 A2 | 10/2007 |

OTHER PUBLICATIONS http://www.teslamotors.com/blog2/?p=50, Tesla Motors, pp. 1-42, (Published May 22, 2007).

(Continued)

*Primary Examiner* — Jonathan Crepeau
*Assistant Examiner* — Jacob Buchanan
(74) *Attorney, Agent, or Firm* — David B. Kelley; Brooks Kushman P.C.

(57) ABSTRACT

A battery includes a plurality of stacking supports including retaining flanges and support surfaces; and a plurality of generally cylindrical cells. Each cell is supported on a pair of the support surfaces. Each cell has an annular notch defined in a side wall with the annular notch mating with one retaining flange. The cells are arranged upon the stacking supports in a plurality of cell rows. The support surfaces are arranged on the stacking supports in such a manner so that the cells are arranged in a close-packed array and to maintain at least a predetermined distance between adjacent cells.

19 Claims, 7 Drawing Sheets

U.S. PATENT DOCUMENTS

| | | | |
|---|---|---|---|
| 2007/0259263 A1* | 11/2007 | Shibuya et al. | 429/186 |
| 2008/0124618 A1 | 5/2008 | Shimoyama | |
| 2008/0124627 A1* | 5/2008 | Shimoyama | 429/186 |
| 2008/0152993 A1 | 6/2008 | Seiler et al. | |
| 2008/0182158 A1 | 7/2008 | Houchin-Miller et al. | |
| 2009/0155680 A1 | 6/2009 | Maguire et al. | |
| 2009/0208836 A1 | 8/2009 | Fuhr et al. | |
| 2009/0311891 A1 | 12/2009 | Lawrence et al. | |

OTHER PUBLICATIONS http://www.sae.org/technical/papers/1999-01-2626, Validation of Modified Wine-Rack Thermal Design for Nickel-Hydrogen Batteries in Landsat-7 Spacecraft Thermal Vacuum Test and in Flight, pp. 1-2, (Published Aug. 1999).

* cited by examiner

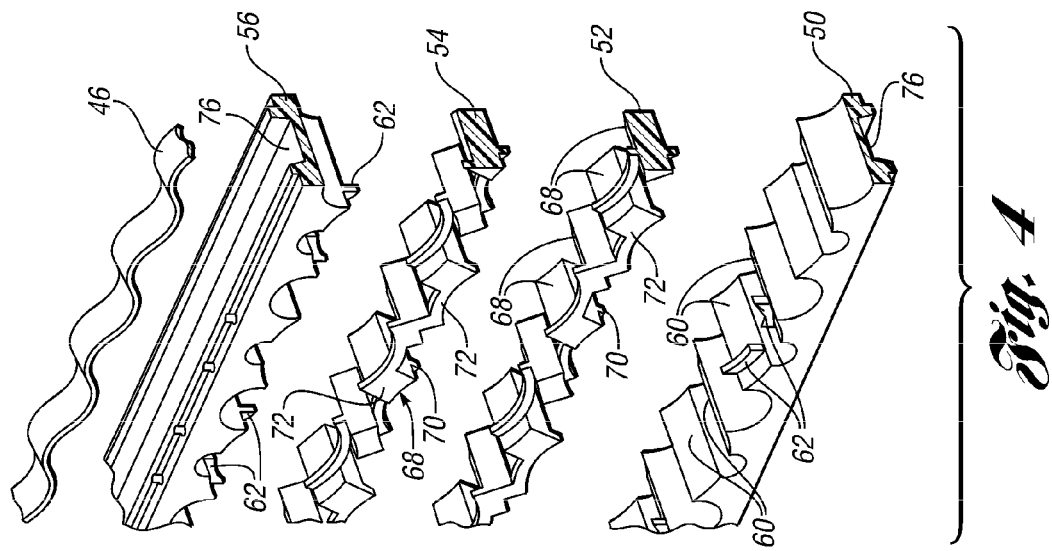
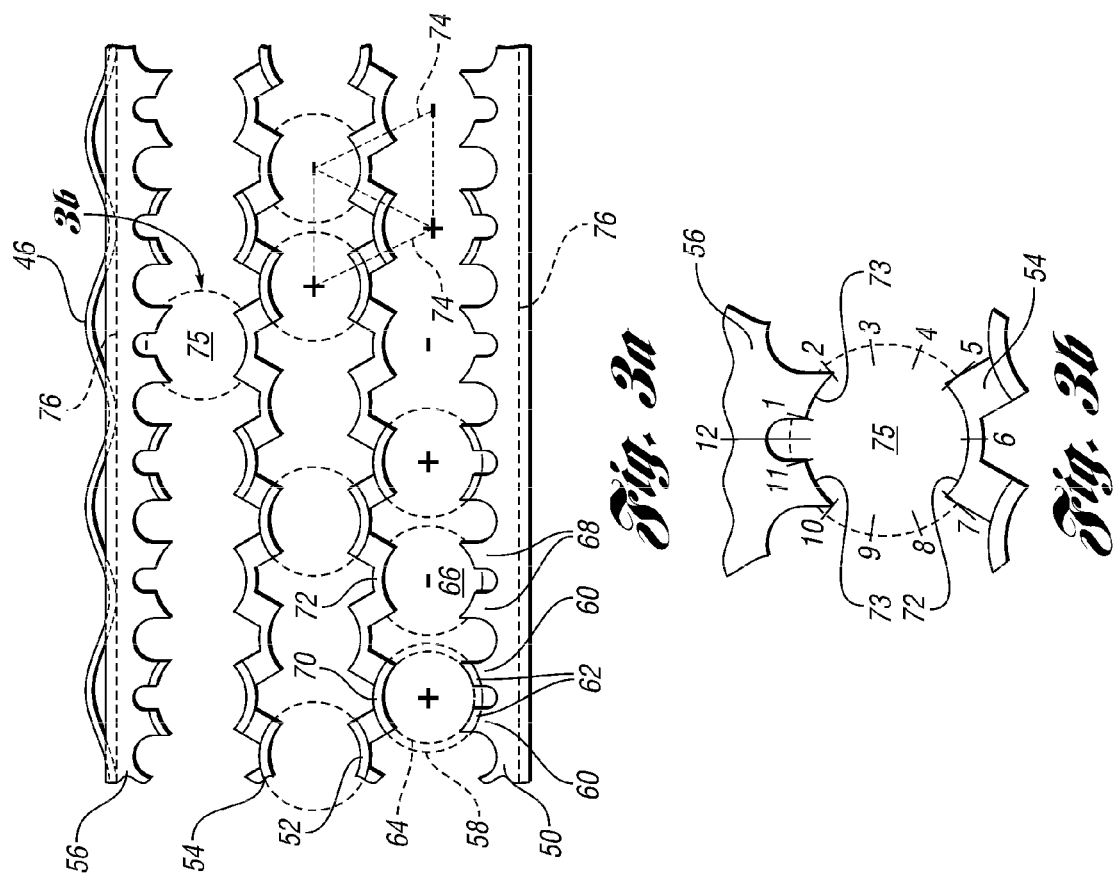

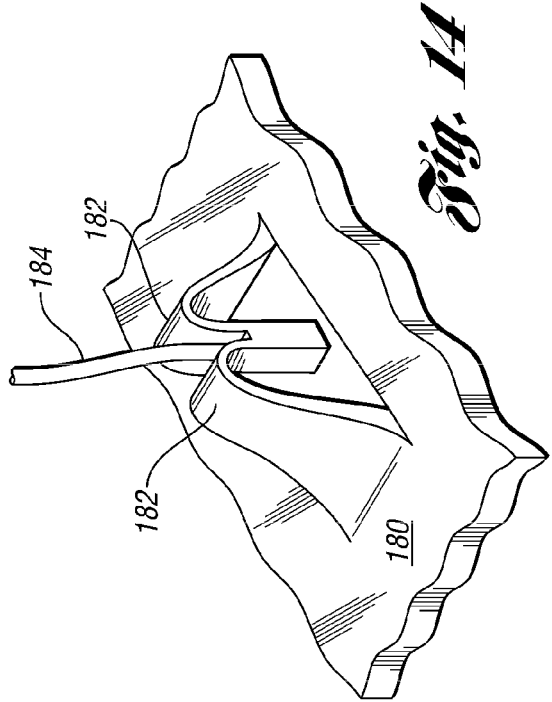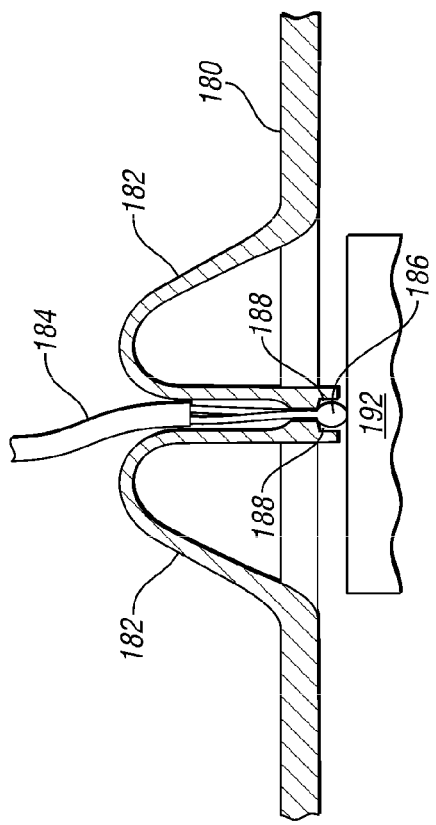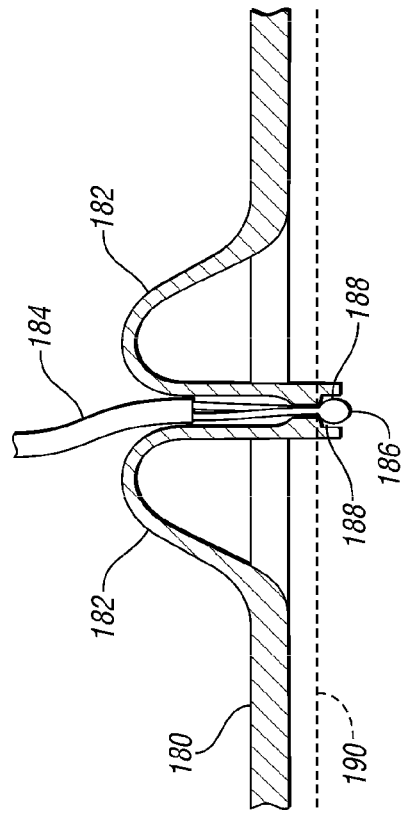

SUPPORT ASSEMBLY FOR AN ARRAY OF BATTERY CELLS

BACKGROUND

1. Technical Field

The disclosure relates to a support assembly for an array of cells as part of a battery.

2. Background Art

An electric vehicle (EV), a hybrid electric vehicle (HEV), and a fuel cell vehicle (FCV) generally include a high-voltage storage battery. In operation, the storage battery provides electric power to operate various components in the vehicle, such as an electric motor coupled to vehicle wheels. The storage battery generally includes a plurality of electrochemical cells that can store electric charge. For example, the storage battery may be a lithium-ion battery. Some issues that arise include: efficiently packaging an array of cells, effectively coupling the cells to provide the desired battery characteristics, providing sufficient cooling to ensure that the cells do not overheat, and providing sensors to all, or at least many, of the cells for measuring voltage and temperature to detect incipient cell operational problems.

SUMMARY

A battery is disclosed which includes a first plurality of cell pairs, with each cell pair coupled longitudinally and each cell of the cell pair having an annular notch proximate a positive terminal of the cell. The first plurality of cell pairs is placed onto first and second lower support strips. The support strips have support surfaces to receive the first plurality of cell pairs and a retaining flange extending upwardly and mating with one notch of a cell pair. The first and second lower support strips are roughly rectangular cuboid in shape. The support strips have several features to retain cells, which cause the support strips to be other than a rectangular cuboid. The long edges of the lower support strips are arranged parallel to each other and a longitudinal axis of cell pairs is arranged substantially perpendicular to the long edges of the lower support strips. First and second middle support strips are placed over the first plurality of cell pairs. A lower side of the middle support strips has support surfaces and at least one retaining flange extending downwardly. The support surfaces engage with the first plurality of cell pairs and the downwardly extending retaining flange mates with one notch associated with one cell pair of the first plurality of cell pairs. An upper side of the first and second middle support strips has support surfaces configured to receive cell pairs and an upwardly extending retaining flange. A second plurality of cell pairs is provided with each cell pair coupled longitudinally and each cell having an annular notch proximate a positive terminal of the cell. An annular notch mates with the upwardly extending retaining flange associated with first and second middle support strips. Third and fourth middle support strips are placed over the second plurality of cell pairs. A lower side of the middle support strips has support surfaces and at least one retaining flange extending downwardly. The support surfaces engage with the second plurality of cell pairs and the downwardly extending retaining flange mates with one annular notch associated with one cell pair. An upper side of the third and fourth middle support strips has support surfaces configured to receive cell pairs and an upwardly extending retaining flange. A third plurality of cell pairs is also provided with each cell pair coupled longitudinally and each cell having an annular notch proximate a positive terminal. The annular notch mates with the upwardly extending retaining flange associated with third and fourth middle support strips.

Each cell pair has a positive terminal end and a negative terminal end and the first plurality of cell pairs are placed in the first lower support strip in an alternating pattern such that every other set of support surfaces receives a positive terminal end and the remaining support surfaces receive a negative terminal end. The cells are roughly cylindrical and the receiving support surfaces contact the cells at approximately the five and seven o'clock positions and the engaging support surfaces contact the cells at approximately the eleven and one o'clock positions.

Such a battery configuration minimizes the amount of plastic used to support the cells, particularly compared to a structure in which groups of cells are housed in a plastic structure prior to being assembled into an array of cell groups to form the battery. Such reduction in plastic reduces cost, weight, part count, number of assembly steps, and packaging volume. Packaging volume also benefits by arranging cells in a close-packed array.

BRIEF DESCRIPTION OF THE DRAWINGS

FIG. 3a is an end view of the stacking supports with cells shown in phantom;

FIG. 3b is a portion of stacking supports indicating positions of support surfaces in relation to a cell shown in phantom FIG. 4 is a perspective, exploded view of the stacking supports and resilient bands;

FIG. 14 shows a portion of an end plate; and

FIGS. 15 and 16 show a cross section of a portion of an end plate with a temperature sensor inserted.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
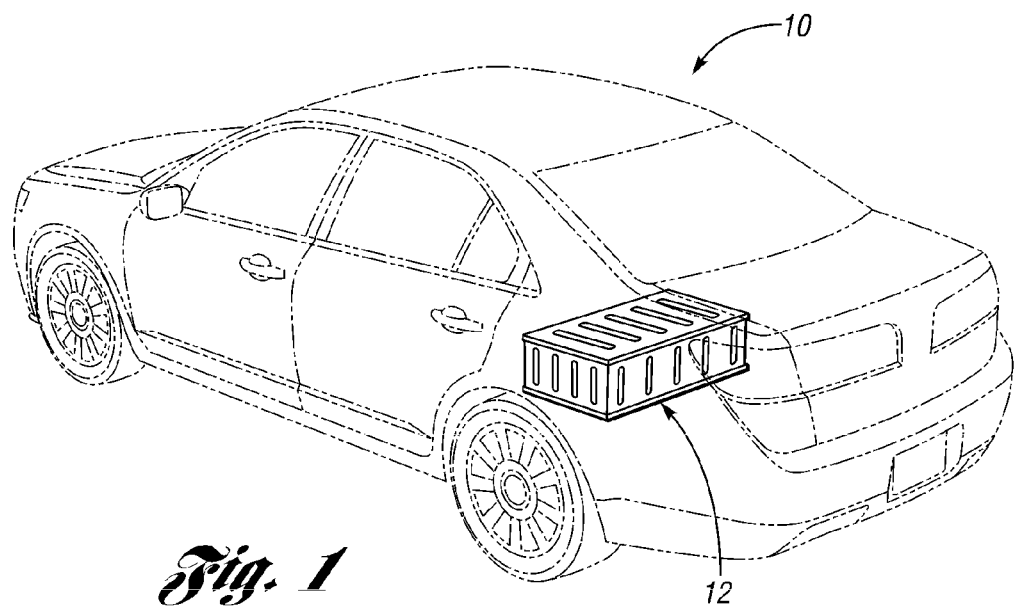
FIG. 1 is a schematic perspective view illustrating an automotive vehicle and a battery disposed within the vehicle.
Figure 2:
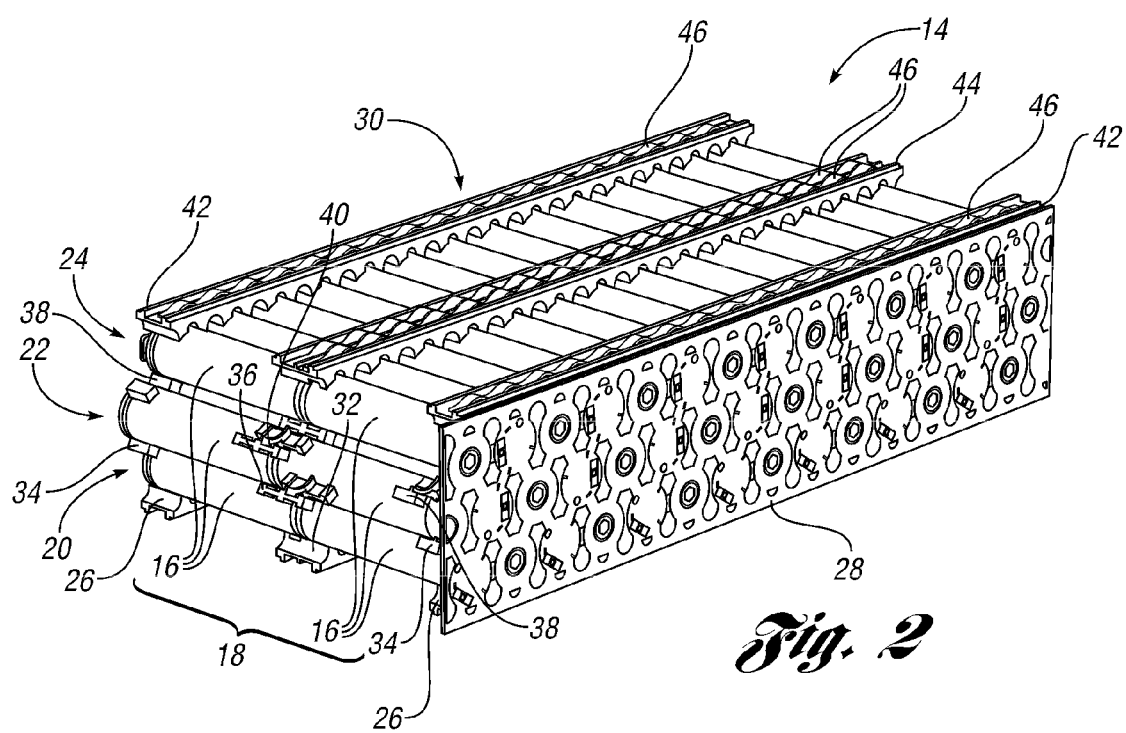
FIG. 2 is a perspective view illustrating a battery including a plurality of cells and a plurality of stacking supports.

In FIG. 1, a vehicle 10 having a battery 12 is shown. In FIG. 2, a perspective view of a battery 14 without the outer case is shown. Battery 14 has a plurality of cells 16 arranged into cell pairs 18 along a longitudinal axis of cells 16. The pairing of cells into a cell pair 18 is one non-limiting example. In another embodiment, individual cells are arranged in an array. In other embodiments, more than two cells are coupled longitudinally to form cell groups, which are then arranged to form an array of cells. A relevant factor in choosing the number of cells arranged longitudinally is cooling of the cells. If the cooling media is introduced at one end and travels along the length of the cell group, the last cell along the cooling path receives cooling media at a higher temperature than the first cell along the cooling path.

In the embodiment shown in FIG. 2 cell pairs are arranged into first, second, and third rows 20, 22, and 24, respectively, of cell pairs with support strips maintaining the relatives positions of cells 16. Lower support strips 26 are placed below the first row of cells 20 and arranged parallel and proximate plates 28 and 30 (30 is not visible in FIG. 2). Another lower support strip 32 is placed parallel to strips 26 and is generally centered between strips 26. More or fewer lower support strips 32 are provided depending on the number of cells coupled longitudinally. On top of the first row of cell pairs 20, outer middle support strips 34 and center middle support strip 36 are placed. On top of support strips 34 and 36, the second row 22 of cell pairs is placed. Another set of outer middle support strips 38 and center middle support strip 40 are placed over the second row 22 of cell pairs. The embodiment of FIG. 1 has three rows of cells pairs. In other embodiments fewer or more rows of cell pairs can be assembled, with the number of outer middle support strips and center middle support strips increased or decreased accordingly. Upper support strips 42 and 44 are provided on top of the top row of cell pairs, which is third row 24.

Support strips 26 and 42 have identical designs, but are oriented differently, with support surfaces (not readily viewed in this Figure) support strip 26 extending upwardly and support surfaces of support strip 42 extending downwardly, i.e., support surfaces engaging with cells. Support strips 44 and 32 are similarly identical, as well as support strips 34 and 38 and support strips 36 and 40.

Continuing to refer to FIG. 2, support strips 26 and 32 have a trough facing downwardly (not visible in the view provided in FIG. 2); and support strips 42 and 44 have a trough facing upwardly. A resilient band 46 is placed into the troughs associated with upper support strips. The strip is wavy with a bottom of the wave extending into a bottom surface of the trough. When a cover is placed over battery 14, resilient bands 46 are squeezed to provide compression to maintain the relative positions of the cells within battery 14.

In FIG. 3a, portions of support strips 50 (lower), (first middle), 54 (second middle), and 56 (upper) are shown. The portion of support strip 50 shown can support six cells on one end, such as the close end viewed in FIG. 3. Another support strip is provided on the far end of the cells (or cell pairs), such support strip is not visible in FIG. 3a. A cell 58 (shown in phantom in FIG. 3a) can be placed onto support surfaces 60. Extending upwardly from support surfaces 60 are retaining flanges 62. Cell 58 has an annular notch 64 near the positive terminal end which engages with retaining flanges 62. In an alternative embodiment, retaining flanges 62 are connected to form a single retaining flange. To the right of cell 58 is another cell 66 received by support surfaces 68. In one embodiment, support surfaces are concave to cradle the outside cylindrical surface of the cells.

A row of cells sitting upon support strip 50 alternate between having a positive terminal end sitting on support strip 50, cell 58 being such an example, and a negative terminal end sitting on support strip 50, cell 66 being such an example. Thus, within a row of cells, negative terminal ends are adjacent to positive terminal ends and vice versa.

The first middle support strip 52 is placed over the first row of cells. Support strip 52 has a retaining flange extending downwardly and engaging with annular notch 64 of cell 58. Support strip 52 has a lip 72 extending downwardly proximate cell 66. The front edge of cell 66 is behind lip 72. Lip 72 can prevent cell 66 from sliding out. In addition to being placed over the first row cells, first middle support strip 52 provides support for second row cells. Second row cells are offset from first row cells due to the support structure of first middle support strip 52 so that they are in a close-packed array. The closest pack arrangement is when the centers of three proximate cells are equidistant from each other, i.e., forming an equilateral triangle. However, in the embodiment shown in FIG. 3a, the centers of three proximate cells form isosceles triangles 74, which provides a close-packed array, although not a closest-packed array.

In FIG. 3b, second middle support strip 54 contacts cell 75 between the 5 o'clock and 6 o'clock positions and between the 6 o'clock and 7 o'clock positions. The actual support surfaces on which cell 75 sits are not visible in this view because they are blocked by lip 72. Upper support strip 54 extends downwardly and also contacts cell 75. The support surfaces are not visible due to being blocked by lips 7. These upper support surfaces contact cell 75 between the 11 and 12 o'clock position and between the 12 and 1 o'clock positions. Note that all the cells in the battery are nominally identical, except in orientation and coupling. However, different reference numerals are assigned to various cells for illustration purposes to identify features relevant to the disclosure.

Referring back to FIG. 3a, second middle support strip 54 is placed over the second row of cells and supports the third row of cells. Over the top of the third row of cells is upper support strip 56. The upper surface of strip 56 has a trough 76 into which a resilient band 46 is placed. Resilient band 46 can be a metallic strip. Any suitable springy or resilient material can be used in trough 76; furthermore, other suitable shapes can be used in place of the wavy spring shown in FIG. 3a.

A perspective, exploded view of the strips is shown in FIG. 4. From the view in FIG. 4, it can be seen that retaining flanges 70 on support strip 52 are set back from a front surface of support strip 52. Lips 72 are flush with the front surface of support strip 52. Also, a pair of support surfaces 68 on support strip 52 cradles an end of a cell (not shown) and another pair of support surfaces extending down from support strip 54 are also in contact with the cell, so that the cell is held in place by four support surfaces on its periphery.

Figure 5:
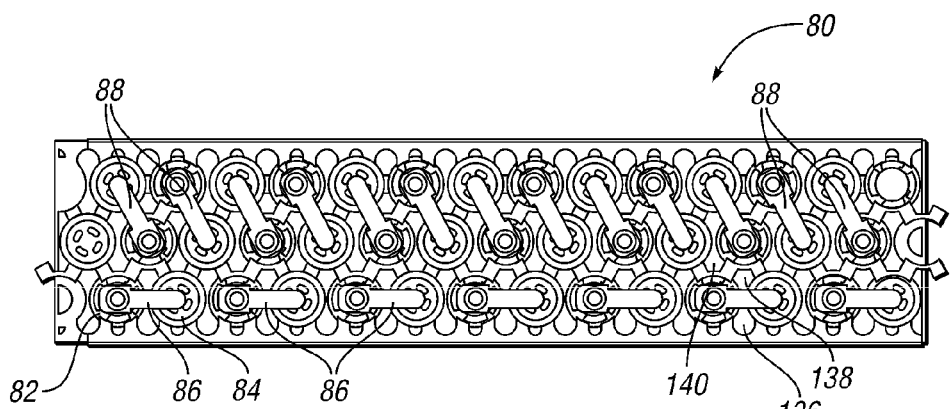
FIG. 5 is an end view of a battery showing busbars coupling cells.
Figure 6:
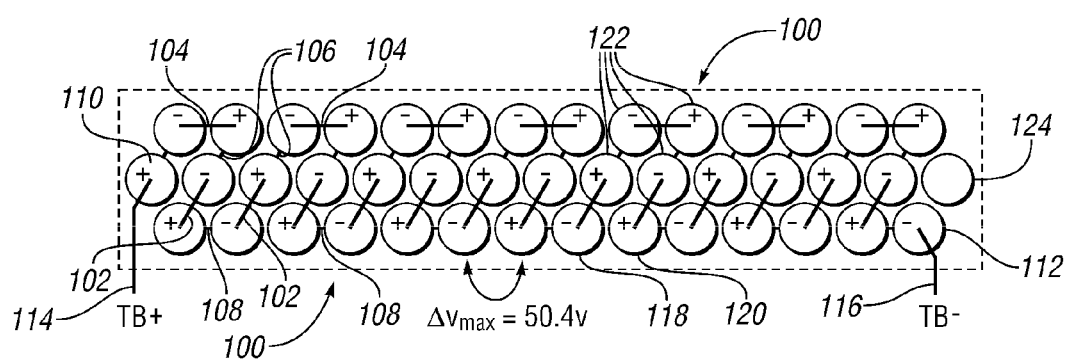
FIG. 6 is an end view schematic of a battery showing busbars coupling cells on the close end and a portion of busbars coupling cells at the far end.

In FIG. 5, an end view of a battery 80 is shown having three rows of cells with fourteen cells per row alternating between positive and negative terminals pointing outward. In FIG. 5, the negative terminal of cell 82 and the positive terminal of cell 84 are visible. Seven busbars 86 couple adjacent cells along the bottom row of cells. Thirteen busbars 88 couple cells in row two with cells in row three. There are also busbars provided on the other end of the cells, which is illustrated schematically in FIG. 6, in which a battery has forty-two cell pairs arranged in three rows. Only the close cell of the cell pair is visible in FIG. 6. At least a portion of all the busbars are visible in FIG. 6, with busbars 102 and 104 coupling close cells of the cell pairs and busbars 106 and 108 coupling far cells of the cell pairs. Cell 110 is at the most positive potential and a battery lead 114 exits battery 100. Similarly, cell 112 is at the most negative potential and a battery lead 116 exits battery 100. If the potential within a single cell is 4.2 V, each cell shown in FIG. 6 represents a cell pair, and there are 42 cell pairs, the potential between lead 114 and 116 is 176 V. It is desirable to avoid shorting between adjacent cells, such as cells 118 and 120. There are 10 cells between cells 118 and 120: one behind each of cells 118 and 120, as well as four pairs of cells 122. Between the terminal ends of cells 118 and 120, there is a potential difference of 50.4 V (12 cells at 4.2 V per cell). An air gap of 1.6 mm is sufficient to avoid shorting. A 2 mm gap is provided to allow a margin of safety. The desired gap may vary depending on the type of cell, how the cells are coupled, the type of vibration that the battery is subjected to, and the desired safety factor. In FIG. 6, battery 100 has a dummy cell location 124 due to the close-packed array arrangement causing cells to not line up vertically. In such embodiment, dummy cell location 124 can be used for cable leads to be brought in and out of battery 100, e.g., sensor wires. In another embodiment, the right hand side of battery 100 can be brought in with only a portion of dummy cell location 124 remaining. In yet another embodiment, two additional cells are provided in location 124 and the cell in location 124 has most negative potential.

Figure 7:
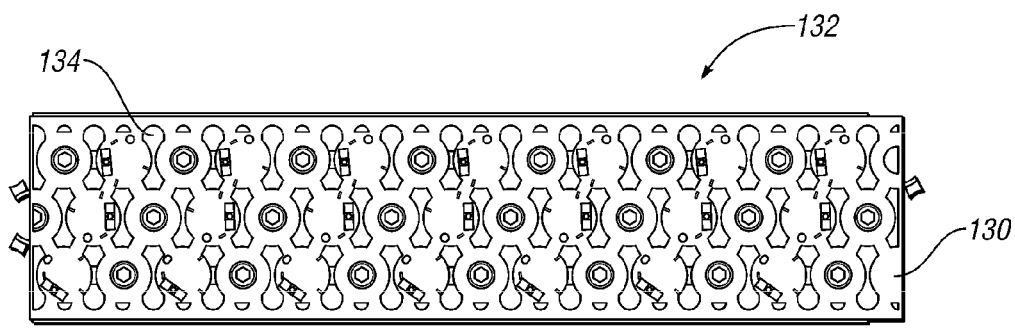
FIG. 7 is an end view of a battery with a cover over the end showing inlet ports for introducing cooling air to the cells.

Cells liberate energy during charging/discharging operations. To avoid overheating and damaging cells, it is typical to cool the cells. In one embodiment, cooling air is provided longitudinally along cell pairs. In FIG. 7, an end plate 130 of battery 132 has openings 134 for allowing cooling air to pass into the compartment with the cells. At the far end, the air exits the compartment with the cells. Referring again to FIG. 5, voids 136, 138, and 140 roughly line up with openings 134.

Figure 8:
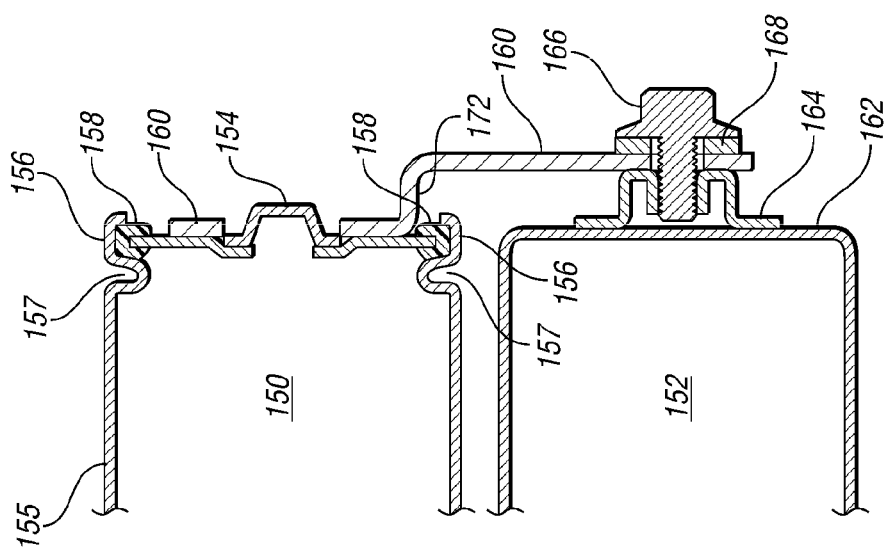
FIG. 8 shows portions of two adjacent, coupled cells in cross section.

In FIG. 8, portions of two adjacent cells 150 and 152 are shown in cross section. A positive terminal 154 of cell 150 is joined with cell body 155 by crimp joint 156. A short circuit between positive terminal 154 and cell body 155 is avoided by providing an insulator 158 within crimp joint 156 to separate the two. A notch 157 is located proximate crimp joint 156. A busbar 160 is welded to positive terminal 154. Busbar 160 extends from positive terminal 154 toward cell 152. Cell 152 has a negative terminal 162 pointing in the same direction as positive terminal 154 of cell 150. A standoff 164 is coupled to negative terminal 162, in one embodiment by welding. An opening in busbar 160 is placed proximate standoff 164. A washer 168 is placed over busbar 160. Washer 168 is not included in some embodiments. Standoff 164 is internally threaded to permit engagement with a bolt 166 having suitable threads. Bolt 166 holds busbar 160 in place. The potentials of positive terminal 154 of cell 150, busbar 160, standoff 164, washer 168, and bolt 166 are substantially identical as they are in electrical communication.

Figure 9:
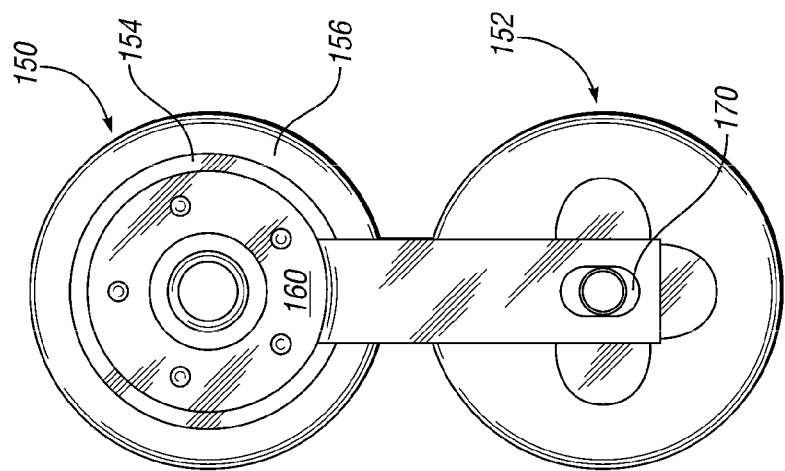
FIG. 9 shows an end view of two adjacent, coupled cells.

An end view of adjacent cells 150 and 152 is shown in FIG. 9. Positive terminal 154 is provided in an inner portion of the end of cell 150. Crimp joint 156, which is at a negative polarity with respect to positive terminal 154, occupies an outer portion of the end of cell 150. Busbar 160 extends toward cell 152. Busbar 160 has a slotted hole 170.

Figure 10:
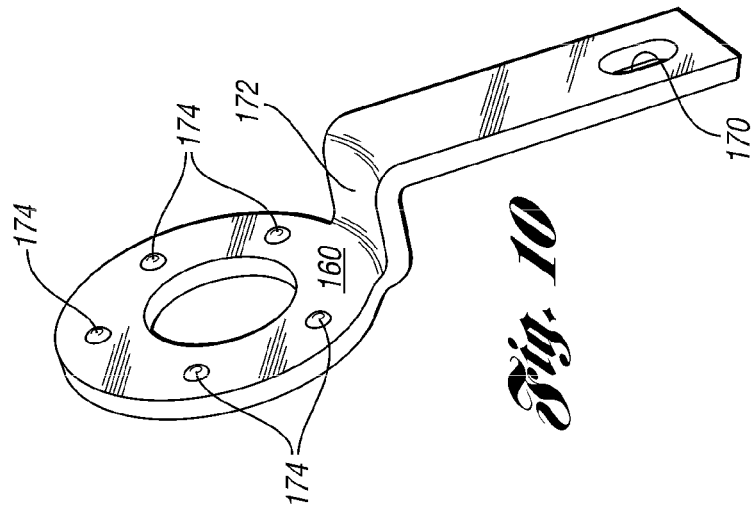
FIG. 10 shows a busbar in a perspective.

A perspective view of busbar 160 is shown in FIG. 10 showing slotted hole 170, zig 172 (which is also shown in FIG. 8), and locations 174 for welds. Zig 172 is provided so that busbar 160 does not come into contact with crimp joint 156 (shown in FIG. 8). As busbar 160 is at the potential of positive terminal 154 and crimp joint 156 is at the negative potential of cell body 155, contact between busbar 160 and crimp joint 156 would cause a short circuit.

Figure 11:
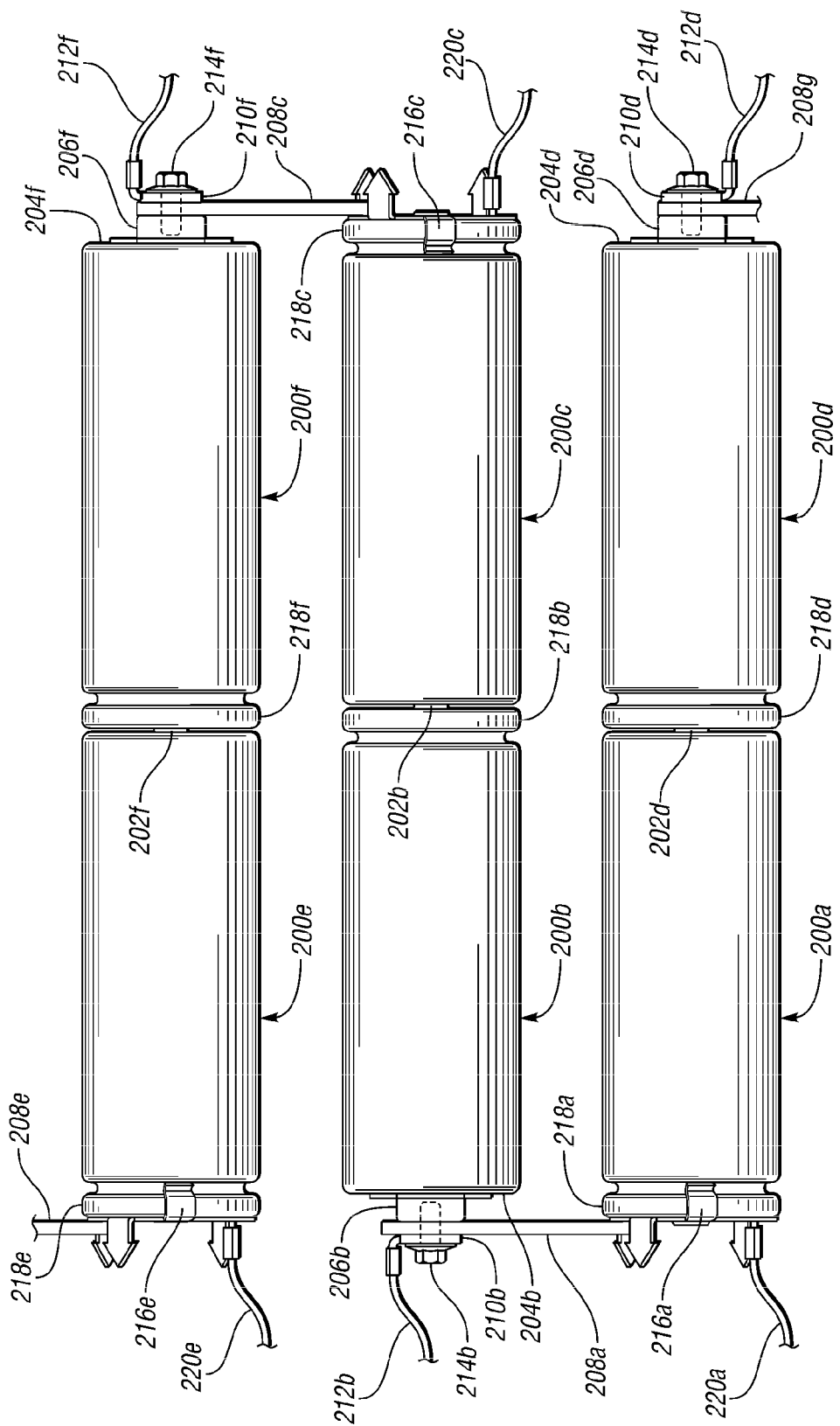
FIG. 11 shows two longitudinally coupled cell pairs coupled at one end by a busbar.

In FIG. 11, six cells 200a-f, which are a small portion of a cell array, are shown. Cells 200a and 200d are coupled longitudinally and form a first cell pair. Cells 200b and 200c are coupled longitudinally and form a second cell pair; and cells 200e and 200f are coupled longitudinally to form a third cell pair. Only a portion of positive terminals 202b, 202d, and 202f are visible in FIG. 11. Negative terminals 204b, 204d, and 204f for cells 200b, 200d, and 200f are provided with stand offs 206b, 206d, and 206f, respectively. As discussed above in regards to the arrangement of cells in an array, a positive terminal of one cell is adjacent a negative terminal of another cell, such as with positive terminal of cell 200a (positive terminal not visible in FIG. 11, but is at leftmost side of FIG. 11) being adjacent negative terminal 204b of cell 200b. The positive terminal of cell 200a is electrically coupled to negative terminal 204b of cell 200b via busbar 208a. Busbar 208a couples with negative terminal 204b of cell 200b through standoff 206b and bolt 214b; thus, all these elements are at the same electric potential. In the embodiment shown in FIG. 11, a washer 210b is provided between standoff 206b and bolt 214b. A voltage sense lead 212b is coupled to washer 210b. In an alternative embodiment, no washer 210b is provided and voltage sense lead 212b is coupled to busbar 208a or to standoff 206b. The surfaces of the cylindrical bodies of cells 200a-f that are visible in FIG. 11 are of a negative potential with respect to their positive terminals (e.g., in regards to cell 200d, positive terminal 202d is positively charged with respect to the cylindrical body of cell 200d, which is negatively charged. Snap rings 216a, 216c, and 216e are coupled with crimp joints 218a, 218c, and 218e of cells 200a, 200c, and 200e, respectively. The snap rings will be discussed in more detail below in regards to FIGS. 12 and 13. Snap rings 216a, 216c, and 216e are provided with sense leads 220a, 220c, and 220e. Snap rings 216a, 216c, and 216e are at the electric potential of negative terminals of cells 200a, 200c, and 200e, respectively. Thus, by measuring the potential difference between sense lead 212b (at same potential as busbar 208a) and sense lead 220a (at same potential as snap ring 216a), the potential across cell 200a can be determined. The potential across cell 200b, which is in a cell pair with cell 200c, is determined by measuring voltage between sense lead 212b and sense lead 220c coupled to snap ring 216c. For cell pairs, potential is determined through measurements at both ends of the cell pair. However, this presents an advantage over taking measurements at the junction between cells of a cell pair. The measurement configuration shown obviates the need to take a measurement proximate negative terminal 204a to determine the voltage across cell 200a The voltage across each of the cells shown can be measured according to the following table.

| Cell | Negative | Positive |
| --- | --- | --- |
| 200a | Sense lead 220a | Sense lead 212b |
| 200b | Sense lead 212b | Sense lead 220c |
| 200c | Sense lead 220c | Sense lead 212f |
| 200d | Sense lead 212d | Sense lead 220a |
| 200e | Sense lead 220e | Sense lead (not shown) associated with busbar 208e |
| 200f | Sense lead 212f | Sense lead 220e |

The table indicates that the voltages across the six cells can be determined via seven voltage measurements, as the table of twelve elements shows five redundancies. It would pose a challenge to place a conductor proximate the coupling joint between a longitudinally-coupled cell pair. Such a challenge is obviated by an embodiment of the present disclosure in which all voltage measurements are taken at one end or the other end of longitudinally-coupled cell pairs. Voltage measurements, as described in conjunction with FIG. 11 regarding three cell pairs, can be extended to any number of cell pairs. In one embodiment, 84 cells are arranged in 42 cell pairs and electrically serially. Via 85 sense leads, the voltage across each of the 84 cells can be determined.

Figure 12:
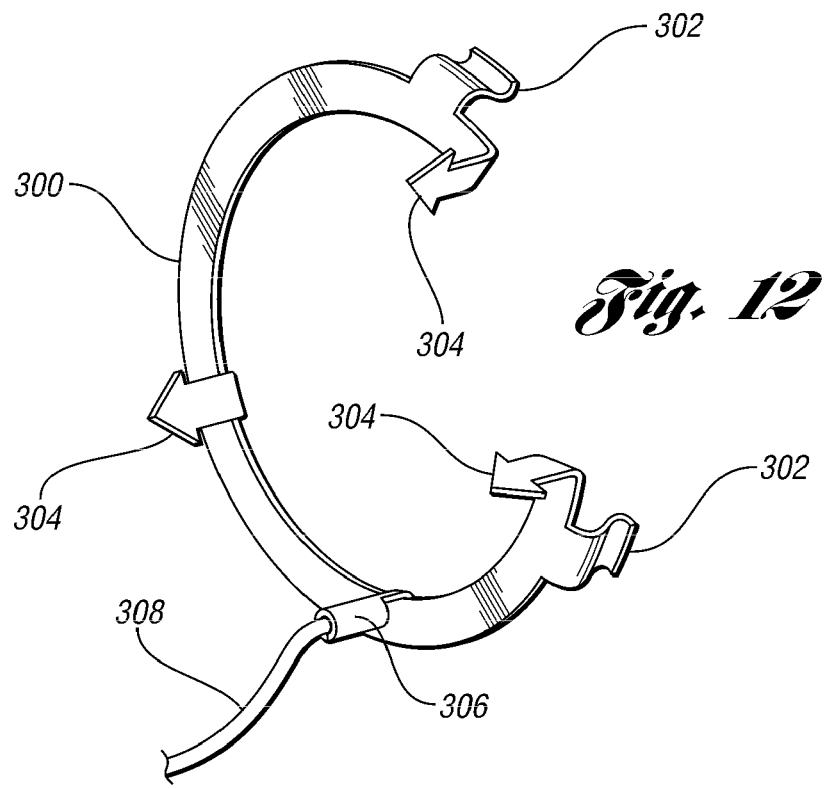
FIG. 12 shows a snap ring in a perspective view.
Figure 13:
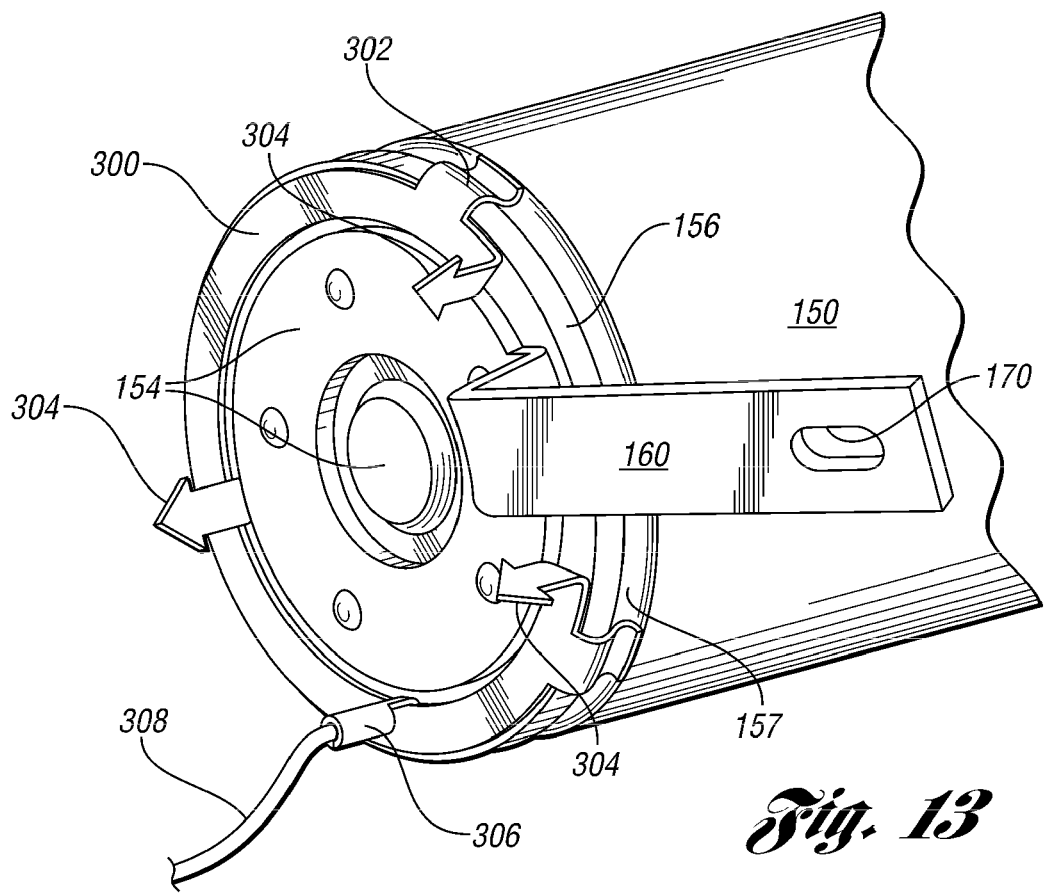
FIG. 13 shows an end of a cell with a busbar and the snap ring coupled thereto.

In FIG. 12, snap ring 300 is shown to include: clips 302 to couple with the notch on the cell, barbs 304 to couple with a battery cover, and a barrel receptacle 306 of conductive material. In the view shown in FIG. 12, two clips 302 are visible. However, in one embodiment, at least one additional clip is provided near the middle of the three barbs 304. However, it is not visible in this view as the third clip is blocked from view by the body of snap ring 300 and barb 304. A voltage sense lead 308 can be provided in barrel receptacle 306. In FIG. 13, clips 302 are engaged with notch 157 of cell 150 to secure snap ring 300 to cell 150. Snap ring 300 sits over crimp joint 156 without touching positive terminal 154 or busbar 160. Snap ring 300 is not a complete ring, but roughly three-quarters of a ring, from 190 degrees to 315 degrees. The break in the ring of snap ring 300 is aligned with the portion of busbar 160 which extends out to slot 170. Busbar 160 is at a different potential than snap ring 300 and thus cannot be in contact. The break in snap ring 300 allows busbar 160 a place to extend from positive terminal 154 without interference. Barbs 304 are shaped to enter pockets molded in a cover plate and to resist removal once inserted into the cover plate.

In FIG. 14, a perspective view of a portion of a face plate 180 is shown, which has leaf springs 182 molded in. A lead 184 from a temperature sensor is shown coming out of the leaf springs 182. In FIG. 15, a cross section of leaf springs 182 within face plate 180 is shown. A bead 186 of a thermistor, or other suitable temperature measuring sensor such as a thermocouple, is shown tucked into pockets 188 molded in lead springs 182. Bead 186 is inserted in leaf springs 182, but is unlikely to pull out due to lodging in pockets 188. Leaf springs 182 are in an unsprung position in FIG. 15. Dashed line 190 shows the average height of an end of a cell when face plate 180 is attached to the array of cells. In FIG. 16, a cross section of face plate 180 is shown, as installed, proximate a cell 192. The tip of leaf springs 182 in which pockets 188 and bead 186 are contained are forced to move upward during installation. Leaf springs 182 are in a deflected or sprung position in FIG. 14 such they exert a force against cell 192, thereby holding bead 186 in contact with cell 192. By spring loading, a certain amount of variation in the distance between cell 192 and face plate 180 can be accommodated without losing contact between bead 186 and cell 192. Illustrated in FIGS. 14-16 is a portion of the face plate. A mounting location, including leaf springs, and pockets 188 can be provided for each cell in a cell array proximate the face plate.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A battery, comprising:
   a plurality of stacking supports, each stacking support including retaining flanges and support surfaces;
   a plurality of generally cylindrical cells, each cell supported on a pair of the support surfaces on one stacking support and a pair of the support surfaces on another of the stacking supports, and each cell having an annular notch defined in a side wall with the annular notch mating with one retaining flange wherein the cells are arranged upon the stacking supports in a plurality of cell rows and the support surfaces are arranged on the stacking supports in such a manner so that the cells are arranged in a close-packed array and to maintain at least a predetermined distance between adjacent cells.

2. The battery of claim 1 wherein stacking supports separate each cell row.

3. The battery of claim 1 wherein the plurality of cell rows comprises at least a first row of cells and a second row of cells, the first row of cells is supported on a pair of stacking supports, and the first row of cells is placed in the pair of stacking supports in an alternating fashion with a positive terminal of each first row cell adjacent to a negative terminal of another first row cell.

4. The battery of claim 1, further comprising:
   busbars electrically coupling a positive terminal of one cell with a negative terminal of a cell adjacent to the one cell.

5. The battery of claim 3 wherein the annular notch is adjacent the positive terminal of each cell and each stacking support has one retaining flange for every other pair of support surfaces.

6. The battery of claim 1 wherein the predetermined distance is based on preventing electrical shorting between adjacent cells.

7. A battery, comprising:
   a first plurality of cell pairs, each cell pair coupled longitudinally and each cell of the cell pair having an annular notch proximate a positive terminal of the cell;
   first and second lower support strips having:
   a side having support surfaces to receive the first plurality of cell pairs; and
   a retaining flange extending upwardly from the side and mating with one notch of one cell pair.

8. The battery of claim 7 wherein the first and second lower support strips are roughly rectangular cuboid in shape with long edges of the lower support strips arranged parallel to each other and a longitudinal axis of cell pairs arranged substantially perpendicular to the long edges of the lower support strips.

9. The battery of claim 7, further comprising:
   first and second middle support strips placed over the first plurality of cell pairs wherein lower sides of the middle support strips have support surfaces and at least one retaining flange extending downwardly, the support surfaces engage with the first plurality of cell pairs, and the downwardly extending retaining
   flanges mate with notches associated with cell pairs.

10. The battery of claim 9, wherein upper sides of the first and second middle support strips have support surfaces configured to receive cell pairs and upwardly extending retaining flanges, the battery further comprising:
   a second plurality of cell pairs with each cell pair coupled longitudinally and each cell having an annular notch proximate a positive terminal wherein annular notches mate with the upwardly extending retaining flanges associated with first and second middle support strips.

11. The battery of claim 10, further comprising:
third and fourth middle support strips placed over the second plurality of cell pairs wherein lower sides of the middle support strips have support surfaces and at least one retaining flange extending downwardly, the support surfaces engage with the second plurality of cell pairs, the downwardly extending retaining flanges mates with notches associated with cell pairs, and upper sides of the third and fourth middle support strips have support surfaces configured to receive cell pairs and an upwardly extending retaining flange; and
a third plurality of cell pairs with each cell pair coupled longitudinally and each cell having an annular notch proximate a positive terminal wherein annular notches mate with the upwardly extending retaining flanges associated with third and fourth middle support strips.

12. The battery of claim 11, further comprising:
first and second upper support strips placed over the third plurality of cell pairs wherein a lower side of the upper support strips has support surfaces and at least one retaining flange extending downwardly wherein the support surfaces engage with the third plurality of cell pairs and the downwardly extending retaining flange mates with one annular notch associated with one cell pair.

13. The battery of claim 12, wherein:
the first and second lower strips are first and second lower end strips;
the first and second upper strips are first and second upper end strips; and
the first, second, third, and fourth middle strips are first, second, third, and fourth middle end strips, the battery further comprising:
a lower center strip having support surfaces to receive the first plurality of cell pairs;
a first center strip having support surfaces on an lower and upper side of the first center strip to engage with the first plurality of cell pairs and to receive the second plurality of cell pairs, respectively;
a second center strip having support surfaces on an lower and upper side of the second center strip to engage with the second plurality of cell pairs and to receive the third plurality of cell pairs, respectively; and
an upper center strip having support surfaces to engage cell pairs wherein the support surfaces of the lower center strip, the first center strip, the second center strip, and the upper center strip contact the cell pairs proximate a location where cells are joined to form cell pairs.

14. The battery of claim 7 wherein each cell pair has a positive terminal end and a negative terminal end and the first plurality of cell pairs are placed in the first lower support strip in an alternating pattern such that every other set of support surfaces receives a positive terminal end, the remaining support surfaces receive a negative terminal, the cells are roughly cylindrical, and the receiving support surfaces contact the cells at approximately five and seven o'clock positions and the engaging support surfaces contact the cells at approximately eleven and one o'clock positions.

15. A method to assemble a battery, comprising:
placing a plurality of lower support strips on a surface;
placing a first plurality of generally cylindrical cells onto support surfaces of the lower support strips wherein the cells are arranged substantially parallel and placed in an alternating fashion with every other cell having a negative terminal pointing in a first direction and the remaining cells having a positive terminal pointing in the first direction;
wherein the lower support strips have retaining flanges proximate every other pair of support surfaces and the cells have an annular notch proximate a positive terminal end of the cell; and
engaging the annular notches with the retaining flanges concomitantly with the placing of the first plurality of cells onto the support surfaces of the lower support strips.

16. The method of claim 15, further comprising:
placing middle support strips over the first plurality of cells;
placing a second plurality of generally cylindrical cells onto the middle support strips wherein the middle support strips have a first set of support surfaces on a first side of the middle support strips placed onto the first plurality of cells and a second set of support surfaces on a side of the middle support strips opposite the first side with the first set of support surfaces and the second set of support surfaces arranged so that the first plurality of cells and the second plurality of cells are in a close-packed array.

17. The method of claim 15 wherein support surfaces are arranged on the lower support strips such that at least a predetermined distance exists between adjacent cells.

18. The method of claim 15, further comprising:
placing a first plurality of middle support strips over the first plurality of cells;
placing a second plurality of generally cylindrical cells onto the first plurality of middle support strips;
placing a second plurality of middle support strips over the second plurality of cells;
placing a third plurality of generally cylindrical cells onto the second plurality of middle support strips wherein the first and second pluralities of middle support strips have support surfaces on two sides to support cells proximate the middle support strips and the support surfaces on the middle support strips are arranged so that the first, second, and third pluralities of cells are arranged in a close-packed array.

19. The method of claim 18, further comprising:
placing a plurality of upper support strips over the third plurality of cells.

* * * * *